United States Patent
Pezzini

(10) Patent No.: US 7,203,781 B2
(45) Date of Patent: Apr. 10, 2007

(54) BUS ARCHITECTURE WITH PRIMARY BUS AND SECONDARY OR SLAVE BUS WHEREIN TRANSFER VIA DMA IS IN SINGLE TRANSFER PHASE ENGAGEMENT OF PRIMARY BUS

(75) Inventor: Saverio Pezzini, Vimercate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 124 days.

(21) Appl. No.: 10/744,700

(22) Filed: Dec. 23, 2003

(65) Prior Publication Data

US 2004/0225769 A1    Nov. 11, 2004

(30) Foreign Application Priority Data

Dec. 23, 2002 (EP) .................................. 02425790

(51) Int. Cl.
*G06F 13/28* (2006.01)
*G06F 13/36* (2006.01)

(52) U.S. Cl. .................... 710/113; 710/22; 710/52; 710/63; 710/306; 710/308; 710/309

(58) Field of Classification Search ............... 710/52, 710/22, 63, 306, 308, 113, 309
See application file for complete search history.

(56) References Cited

U.S. PATENT DOCUMENTS

| | | | |
|---|---|---|---|
| 5,379,382 A | 1/1995 | Work et al. ................ 710/240 |
| 5,862,387 A | 1/1999 | Songer et al. ................ 710/63 |
| 5,941,968 A * | 8/1999 | Mergard et al. ............ 710/308 |
| 6,775,732 B2 * | 8/2004 | Jahnke et al. ................ 710/306 |
| 6,959,354 B2 * | 10/2005 | Watanabe ..................... 710/309 |

FOREIGN PATENT DOCUMENTS

EP          1231540          8/2002

OTHER PUBLICATIONS

82371AB PCI-TO-ISA/IDE Xcelerator (PIIX4), Intel Corporation, Apr. 1997, pp. 1-284.

* cited by examiner

*Primary Examiner*—Tammara Peyton
(74) *Attorney, Agent, or Firm*—Lisa K. Jorgenson; Allen, Dyer, Doppelt, Milbrath & Gilchrist, P.A.

(57) ABSTRACT

A microprocessor system includes a high speed primary bus, a plurality of master devices coupled to the high speed primary bus, and a plurality of peripherals coupled to the high speed primary bus. The peripherals include at least one memory. An arbiter circuit is coupled to the high speed primary bus for managing access requests to the high speed primary bus by any one of the master devices. The microprocessor system further includes a secondary bus, and a bridge interface circuit coupled between the high speed primary bus and the secondary bus. The bridge interface circuit includes a direct memory access controller so that during each data transfer routine between a peripheral connected to the secondary bus and one of the peripherals reduces to a single transfer phase engagement of the high speed primary bus.

21 Claims, 2 Drawing Sheets

→ DMA read the source (AHB used)

→ DMA write the destination :AHB used

BUS ARCHITECTURE WITH PRIMARY BUS AND SECONDARY OR SLAVE BUS WHEREIN TRANSFER VIA DMA IS IN SINGLE TRANSFER PHASE ENGAGEMENT OF PRIMARY BUS

FIELD OF THE INVENTION

The present invention relates to microprocessor systems, and in particular, to a bus architecture in which a secondary bus is coupled to a high speed primary bus controllable by more than a single master device. Relatively slow peripherals may be coupled to the secondary bus.

BACKGROUND OF THE INVENTION

Processing and/or control systems often use RISC microprocessors that generally use a bus architecture. The bus architecture includes a first high speed multi-master primary bus, which is often referred to as AHB, ASB or another acronym or abbreviation. Fast peripherals, typically memory devices such as nonvolatile memory and RAM, for example, may be coupled to the high speed primary bus through appropriate interfaces. The bus architecture also includes at least a secondary bus, which is often referred to as APB or another acronym or abbreviation. The secondary bus is coupled to the primary bus through an appropriate interface, and relatively slow peripherals such as input/output circuits and the like are coupled to the secondary bus.

A typical architecture of a RISC microprocessor system is shown in FIG. 1. The processor, which in the depicted example is an ARM7 processor, usually has its own bus NATIVE that is interfaced with the high speed primary bus AHB by the block AHB TO NATIVE. This transformed bus supports an appropriate protocol for managing the different information transfer functions that take place through the high speed primary bus AHB.

Typically, the high speed primary bus AHB is a multi-master bus, that is, the control of the bus may be taken by more than one master device. Typically, the high speed primary bus AHB may be controlled by the ARM7 processor, and also by a direct memory access (DMA) controller. The DMA controller may be used for accessing data stored in the memory devices coupled to the primary bus AHB, or for writing data therein based upon peripherals connected to the secondary bus APB. Control of the high speed primary bus AHB by the ARM7 processor or by the DMA controller is managed by an appropriate arbiter circuit ARBITER for preventing conflicts.

As schematically shown in FIG. 2 by the arrows, each data transfer from a peripheral coupled to the secondary bus APB to a peripheral coupled to the primary bus AHB through the DMA controller engages the high speed bus AHB for two transfer cycles or phases. This is regardless of whether there is a transfer of data from the peripheral to the memory or vice versa.

The steps for a DMA transfer are as follows:
1) a certain peripheral sends to the DMA controller a request for a data transfer in a DMA mode;
2) the DMA controller demands to the circuit ARBITER control of the high speed primary bus AHB (a clock cycle);
3) in the case of a data transfer from the peripheral to the RAM memory, the DMA controller reads the data register of the peripheral and writes the read data in a DMA buffer, wherein the high speed primary bus AHB and the secondary bus APB are both used;
4) the DMA controller processes the data (a clock cycle);
5) the DMA controller writes the data in the RAM memory, wherein the high speed primary bus AHB is used and any other master device (e.g., the ARM7 processor) is prevented from accessing the secondary bus APB; and
6) the DMA controller releases control of the high speed primary bus AHB.

The above example is only one of many possible examples for different bus architectures that require access to the primary bus in two transfer phases to complete a DMA data transfer.

SUMMARY OF THE INVENTION

For the above described bus architectures, the duration of interrupt routines for a DMA transfer, which requires taking control of the high speed primary bus for the two transfer phases, may be considerably shortened by reducing to a single transfer phase the engagement of the high speed primary bus. The two transfer phases include data acquisition by the DMA controller followed by transmission of data to the selected peripheral.

According to one embodiment of the present invention, this advantageous result may be achieved by associating or incorporating a bridge interface circuit between the high speed primary bus and the secondary bus. This bridge interface circuit may be a dedicated DMA controller for limiting the requirement of the DMA controller to access the primary bus for only reading or writing data in the memory (fast peripherals) directly connected to the primary bus.

According to another embodiment of the present invention, each bridge interface circuit between the high speed primary bus and the secondary bus includes their own DMA controller. In this way, the duration of all the interrupt routines for exchanging data among peripherals, whether they are relatively slow peripherals coupled to the secondary bus and/or fast peripherals directly coupled through a dedicated interface incorporating a DMA controller to the high speed primary bus, may be reduced to a single event of data transfer through the primary bus.

BRIEF DESCRIPTION OF THE DRAWINGS

The different aspects and advantages of the present invention will be more easily understood through the following description of several preferred embodiments and by referring to the attached drawings, wherein.

DETAILED DESCRIPTION OF THE PREFERRED EMBODIMENTS

Figure 1:
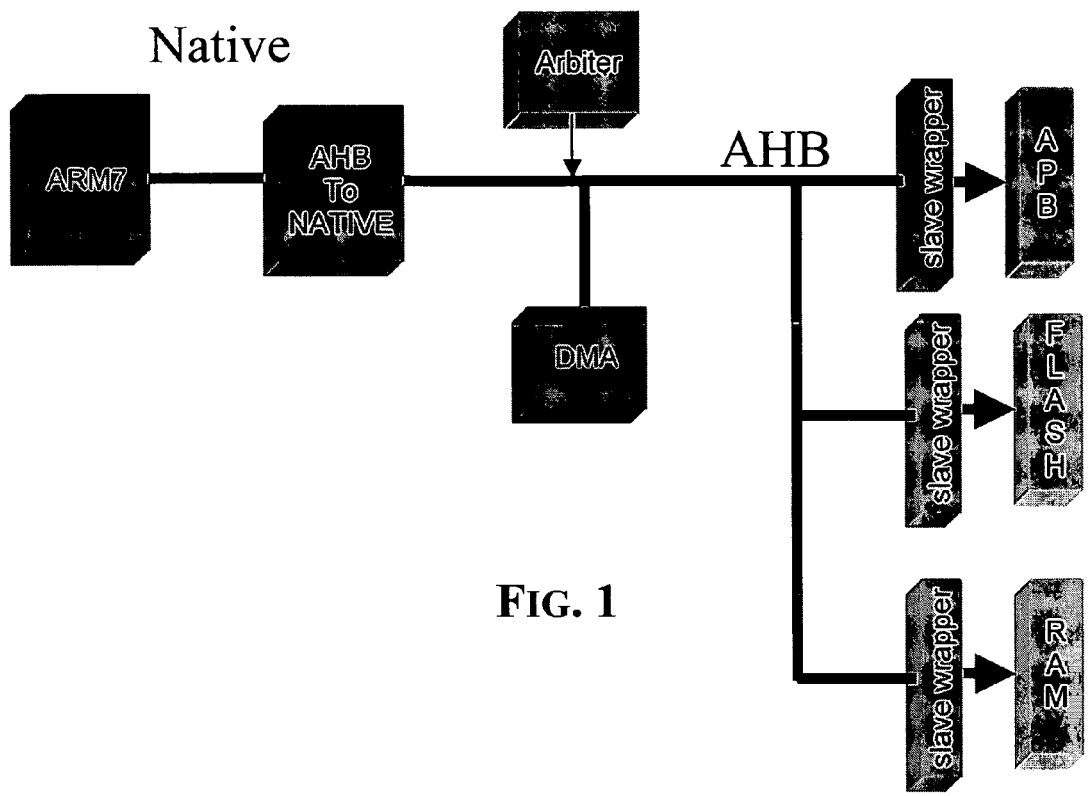
FIG. 1 is a simplified block diagram of a microprocessor system according to the prior art.
Figure 2:
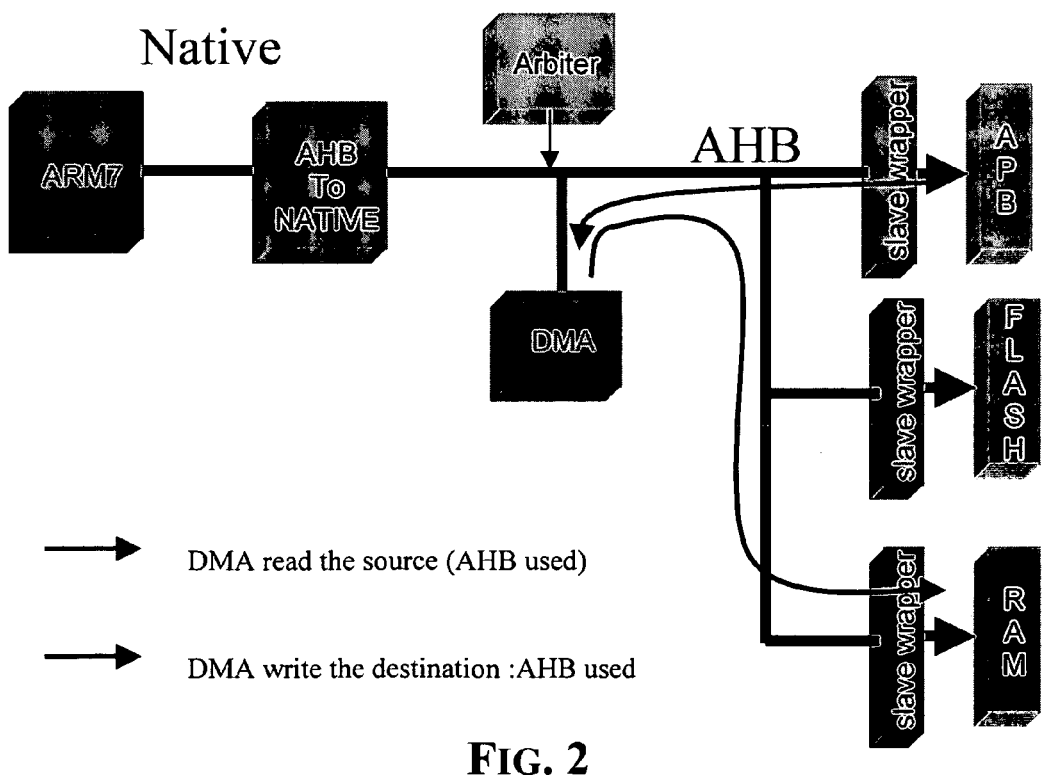
FIG. 2 illustrates the data paths for the microprocessor system shown in FIG. 1 during a transfer cycle from a peripheral coupled to the secondary bus to a random access memory coupled to the high speed primary bus.
Figure 3:
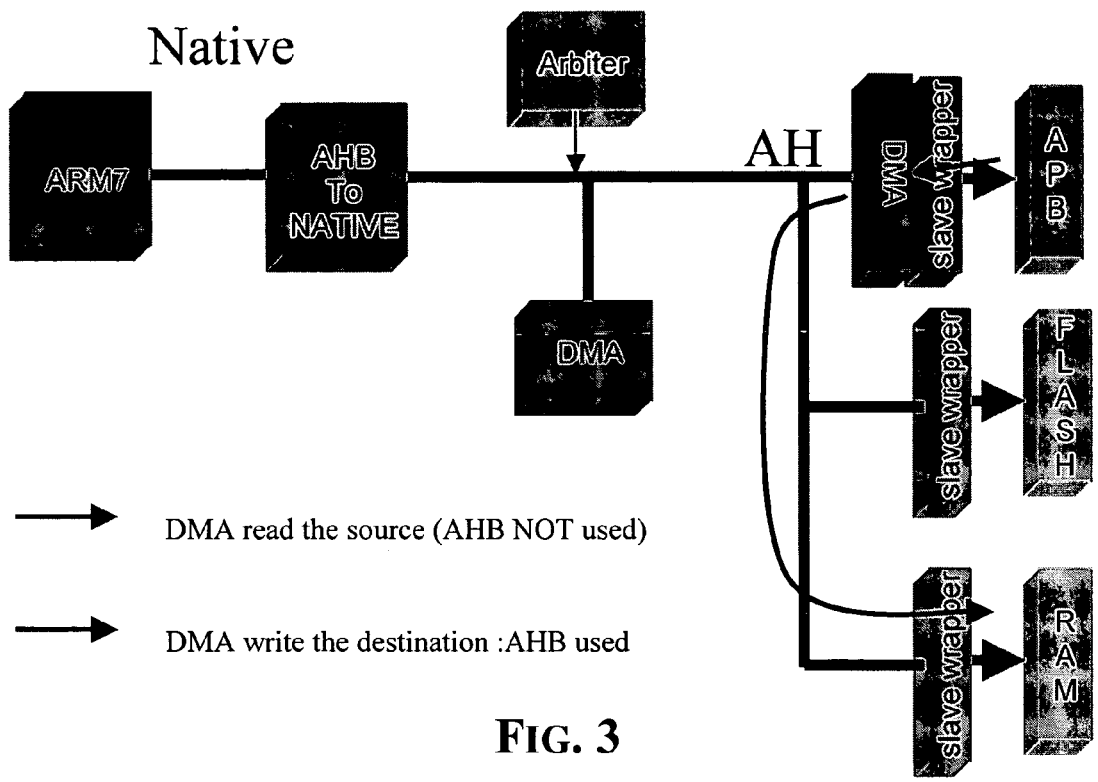
FIG. 3 is a simplified block diagram of a microprocessor system according to the present invention.

For ease of comparison, the specification will refer to a microprocessor system with a sample bus architecture as already discussed above. Referring now to FIG. 3, a DMA controller is associated with or incorporated in the interface or bridging circuit SLAVE WRAPPER between the high speed primary bus AHB and the secondary bus APB. Relatively slow peripherals are connected to the secondary bus APB. The DMA controller allows control of the primary bus AHB to be reduced to a single data transfer event.

The depicted example refers to the writing of data coming from a peripheral (e.g., RAM) coupled to the secondary bus APB. For the system as shown in FIG. 3, a DMA data transfer from a peripheral to the RAM takes place through the following steps:

1) a peripheral sends a transfer request in a DMA mode to the DMA controller in the interface or bridging circuit (SLAVE WRAPPER) between the secondary bus APB to which is coupled the peripheral and the primary bus AHB;

2) the DMA controller incorporated in the interface reads the data register of the peripheral and writes the data in a DMA buffer without engaging the primary bus AHB, only the secondary bus APB is engaged;

3) the DMA controller processes the data (a clock cycle) and demands to the circuit ARBITER control of the high speed primary bus AHB;

4) the DMA controller writes the data in the memory which requires engaging the high speed primary bus AHB; and 5) the DMA controller releases control of the high speed primary bus AHB.

As indicated in the diagram of FIG. 3, during a data read cycle from the register of the peripheral by the DMA controller incorporated in the interface SLAVE WRAPPER, the primary high speed bus AHB is not used. Control of the high speed bus AHB and use thereof may be assumed by another master device, such as the processor ARM7 or the master DMA controller. During this phase, the processor ARM7 or the master DMA controller may transfer data between fast peripherals that are directly coupled to the high speed primary bus AHB, such as between a nonvolatile memory FLASH and the RAM or vice versa, for example.

According to this embodiment of the invention, during a data write phase in the RAM (FIG. 3), the DMA controller associated to the interface between the high speed bus AHB and the secondary bus APB prevents any other master device from accessing the secondary bus APB.

Of course, even in the case of an inverse operation of accessing by a peripheral data recorded in the RAM or in the nonvolatile FLASH memory, the high speed primary bus AHB will be engaged for a single transfer phase. This single transfer phase is for reading data from the RAM or FLASH memory in a buffer of the DMA controller that thereafter will release control of the high speed primary bus AHB and carry out the transfer of the data to the peripheral, using exclusively the secondary bus APB during this phase.

Figure 4:
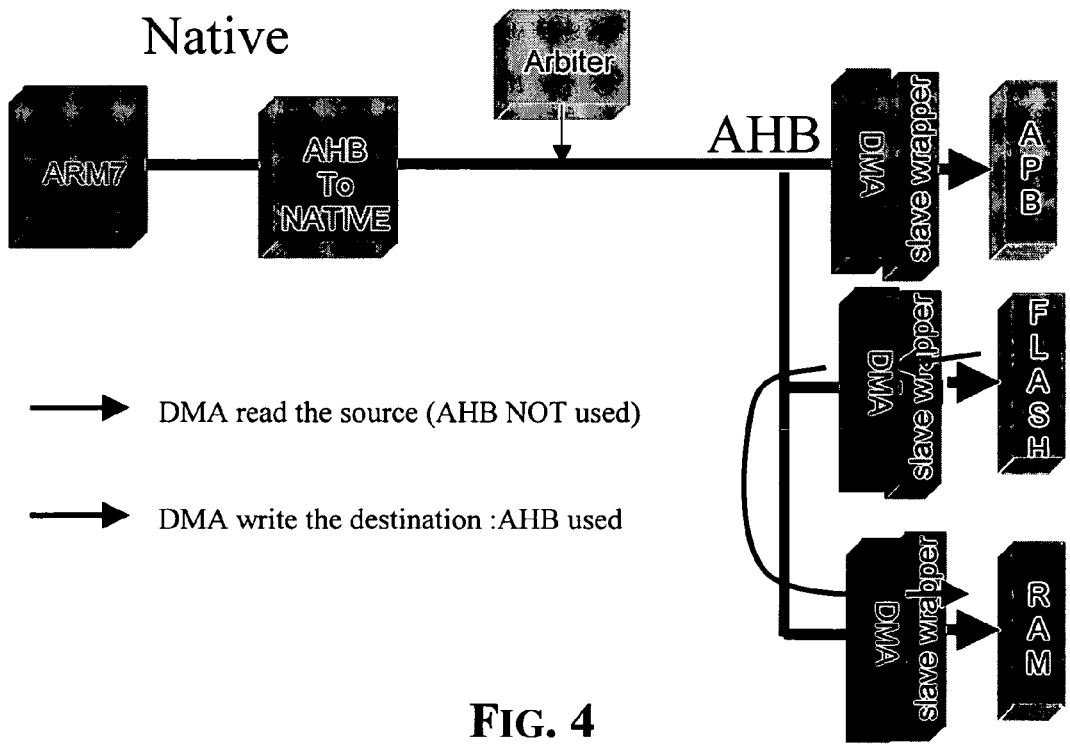
FIG. 4 is a simplified block diagram of another embodiment of the microprocessor system as shown in FIG. 3.

An extended embodiment of the present invention providing further advantages in terms of reduced use of the high speed primary bus AHB for interrupts relative to data transfers is depicted in FIG. 4. According to this preferred embodiment, each interface between the peripheral and the high speed primary bus AHB includes a dedicated DMA controller. Each dedicated DMA controller is for managing transfers in a DMA mode to or from the respective fast peripheral directly coupled to the high speed primary bus AHB and to and from the slow peripherals coupled to the secondary bus APB.

Consequently, for any data transfer on the high speed primary bus AHB, whether the transfer takes place between fast peripherals coupled directly on the same primary bus AHB or between one of these and a peripheral coupled to the secondary bus APB, the primary bus AHB is used for a single transfer phase instead of two transfer cycles.

FIG. 4 shows by respective arrows the two transfer phases when DMA data is transferred from the nonvolatile FLASH memory to the RAM. Even in this case, the reading of data from the source peripheral takes place without engaging the primary bus AHB.

That which is claimed is:

1. A microprocessor system comprising:
   a high speed primary bus;
   a plurality of master devices coupled to said high speed primary bus;
   a plurality of peripherals coupled to said high speed primary bus, said plurality of peripherals comprising at least one memory;
   an arbiter circuit for managing access requests to said high speed primary bus by said plurality of master devices;
   a secondary bus; and
   a bridge interface circuit coupled between said high speed primary bus and said secondary bus and comprising a direct memory access controller so that during each data transfer routine between a peripheral connected to said secondary bus and one of said plurality of peripherals reduces to a single transfer phase engagement of said high speed primary bus.

2. A microprocessor according to claim 1, wherein said plurality of master devices comprises a processor.

3. A microprocessor according to claim 1, wherein said plurality of master devices comprises a second direct memory access controller.

4. A microprocessor system according to claim 1, further comprising a plurality of second bridge interface circuits coupled between said plurality of peripherals and said high speed primary bus, each respective second bridge interface circuit comprising a third direct memory access controller.

5. A microprocessor system according to claim 1, wherein said at least one memory comprises at least one of a random access memory and a nonvolatile memory.

6. A microprocessor system comprising:
   a primary bus;
   a processor coupled to said primary bus;
   at least one memory coupled to said primary bus;
   an arbiter circuit for managing access requests to said primary bus by said processor;
   a secondary bus; and
   a bridge interface circuit coupled between said primary bus and said secondary bus so that during each data transfer routine between a peripheral connected to said secondary bus and said at lease one memory reduces to a single transfer phase engagement of said primary bus.

7. A microprocessor system according to claim 6, wherein said bridge interface circuit comprises a direct memory access controller.

8. A microprocessor system according to claim 6, further comprising at least one second bridge interface circuit coupled between said at least one memory and said primary bus.

9. A microprocessor system according to claim 8, wherein said at least one second bridge interface circuit comprises at least one second direct memory access controller.

10. A microprocessor system according to claim 6, wherein said at least one memory comprises at least one of a random access memory and a nonvolatile memory.

11. A control system comprising:
    a primary bus;
    at least one memory coupled to said primary bus;
    at least one first direct memory access controller coupled between said primary bus and said at least one memory;
    a secondary bus; and a second direct memory access controller coupled between said primary bus and said secondary bus;

each of said at least one first direct memory access controller and said second direct memory access controller operate so that during each data transfer routine between a peripheral connected to said secondary bus and said at least one memory reduces to a single transfer phase engagement of said primary bus.

12. A control system according to claim 11, further comprising a processor coupled to said primary bus.

13. A control system according to claim 12, further comprising an arbiter circuit coupled to said primary bus for managing access requests to said primary bus by said processor.

14. A control system according to claim 12, wherein said at least one memory comprises a random access memory.

15. A control system according to claim 12, wherein said at least one memory comprises a FLASH memory.

16. A method for transferring data in a microprocessor system comprising a primary bus; a plurality of master devices coupled to the primary bus, a plurality of peripherals coupled to the primary bus, the plurality of peripherals comprising at least one memory; an arbiter circuit coupled to the primary bus for managing access requests to the primary bus by the plurality of master devices; a secondary bus; and a direct memory access controller coupled between the primary bus and the secondary bus, the method comprising:

providing a data transfer request to the direct memory access controller from a peripheral coupled to the secondary bus or from the at least one memory; and transferring data via the direct memory access controller between the peripheral coupled to the secondary bus and the at least one memory in a single transfer phase engagement of the primary bus.

17. A method according to claim 16, wherein the plurality of master devices comprises a processor.

18. A method according to claim 16, wherein the plurality of master devices comprises a second direct memory access controller.

19. A method according to claim 16, further comprising a plurality of third direct memory access controllers coupled between the plurality of peripherals and the primary bus.

20. A method according to claim 16, wherein the at least one memory comprises a random access memory.

21. A method according to claim 16, wherein the at least one memory comprises a nonvolatile memory.

* * * * *

UNITED STATES PATENT AND TRADEMARK OFFICE
CERTIFICATE OF CORRECTION

PATENT NO. : 7,203,781 B2 Page 1 of 1
APPLICATION NO. : 10/744700
DATED : April 10, 2007
INVENTOR(S) : Pezzini It is certified that error appears in the above-identified patent and that said Letters Patent is hereby corrected as shown below:

Column 4, Line 46   Delete: " lease"
                    Insert: --least --

Signed and Sealed this

Seventh Day of August, 2007

JON W. DUDAS
*Director of the United States Patent and Trademark Office*